(12) United States Patent
Dorman et al.

(10) Patent No.: US 9,126,751 B2
(45) Date of Patent: Sep. 8, 2015

(54) HOT MELT ADHESIVE DISPENSING SYSTEM INCLUDING ADHESIVE CUT-OFF MODULE

(71) Applicant: Illinois Tool Works Inc., Glenview, IL (US)

(72) Inventors: Kenneth H. Dorman, Carol Stream, IL (US); Bradley G. Carman, Chicago, IL (US); Jyi-Jiin Luo, Morton Grove, IL (US)

(73) Assignee: Illinois Tool Works Inc., Glenview, IL (US)

( * ) Notice: Subject to any disclaimer, the term of this patent is extended or adjusted under 35 U.S.C. 154(b) by 73 days.

(21) Appl. No.: 13/786,936

(22) Filed: Mar. 6, 2013

(65) Prior Publication Data
US 2013/0334252 A1    Dec. 19, 2013

Related U.S. Application Data (60) Provisional application No. 61/660,111, filed on Jun. 15, 2012.

(51) Int. Cl.
| | | |
|---|---|---|
| *B67D 7/80* | (2010.01) | |
| *B65D 83/68* | (2006.01) | |
| *B05C 5/02* | (2006.01) | |
| *F16K 23/00* | (2006.01) | |

(52) U.S. Cl.
CPC .............. *B65D 83/68* (2013.01); *B05C 5/0225* (2013.01); *B05C 5/0229* (2013.01); *F16K 23/00* (2013.01)

(58) Field of Classification Search
CPC ..... B65D 83/68; B05C 5/0229; B05C 5/0025
USPC .............. 222/571, 148, 146.5; 239/106, 112; 251/324, 325
See application file for complete search history.

(56) References Cited

U.S. PATENT DOCUMENTS

| | | | | |
|---|---|---|---|---|
| 3,146,950 | A * | 9/1964 | Lancaster | 239/128 |
| 3,876,114 | A * | 4/1975 | Hicks et al. | 222/148 |
| 3,898,861 | A * | 8/1975 | McMillin | 62/177 |
| 4,073,664 | A * | 2/1978 | Zwirlein | 134/18 |
| 4,174,049 | A * | 11/1979 | Bolen | 222/5 |
| 4,200,207 | A * | 4/1980 | Akers et al. | 222/190 |
| 4,202,497 | A * | 5/1980 | Ten Pas | 239/112 |
| 4,212,414 | A * | 7/1980 | Beyens | 222/148 |
| 4,477,003 | A * | 10/1984 | Baker et al. | 222/642 |
| 4,765,513 | A * | 8/1988 | McMillin et al. | 222/129.1 |
| 4,887,740 | A * | 12/1989 | Smith | 222/129.1 |

(Continued)

FOREIGN PATENT DOCUMENTS

| | | | |
|---|---|---|---|
| EP | 0711943 | A2 | 5/1996 |
| EP | 2163314 | A2 | 3/2010 |

OTHER PUBLICATIONS

International Search Report for PCT/US2013/045724 dated Oct. 1, 2013.

*Primary Examiner* — Donnell Long
(74) *Attorney, Agent, or Firm* — Levenfeld Pearlstein, LLC (57) ABSTRACT

A hot melt adhesive dispensing system includes an adhesive cut-off module, which introduces a non-adhesive liquid medium to cut-off a hot melt adhesive stream without forming an angel hair. The adhesive cut-off module includes a spool valve assembly which is configured to move from an adhesive dispensing position to a liquid dispensing position to cut-off the hot melt adhesive stream.

18 Claims, 6 Drawing Sheets

(56) References Cited

U.S. PATENT DOCUMENTS

| | | | |
|---|---|---|---|
| 5,360,629 A * | 11/1994 | Milbourn et al. | 427/8 |
| 6,105,832 A * | 8/2000 | Beck | 222/571 |
| 7,614,529 B2 * | 11/2009 | Bolyard et al. | 222/504 |
| 7,874,456 B2 * | 1/2011 | Bolyard et al. | 222/55 |
| 8,534,505 B2 * | 9/2013 | Romanin et al. | 222/250 |
| 2007/0267450 A1 * | 11/2007 | Bolyard et al. | 222/504 |
| 2008/0190957 A1 * | 8/2008 | Bolyard et al. | 222/1 |
| 2012/0138181 A1 * | 6/2012 | Smith et al. | 137/884 |

* cited by examiner

HOT MELT ADHESIVE DISPENSING SYSTEM INCLUDING ADHESIVE CUT-OFF MODULE

BACKGROUND

The present disclosure generally relates to hot melt adhesive dispensing systems, and more particularly to an adhesive cut-off module for hot melt adhesive dispensing systems.

Hot melt adhesives and hot melt adhesive dispensing systems are well known. A bull head, which is an adhesive bead formed at the start of an adhesive stream, and an angel hair formed at the end of a run have been known concerns for using hot melt adhesive applicators. Bull heads can result in wasted adhesive and in some instances can cause discomfort if the adhesive bead ends up in a location where it is in contact with an end user. The formation of adhesive beads or bull heads is believed to be caused by air friction slowing a leading edge of an adhesive stream.

Angel hairs are formed due to a poor adhesive cut-off at a nozzle, which creates a thin strand of adhesive. Angel hairs can foul machine components and also cause adhesive to end up in locations that can cause discomfort for an end user. Angel hairs, which are fine adhesive fibers, can be caused by an adhesive shut-off, which is set back some distance from an orifice. When an adhesive module is shut off, adhesive flow is stopped. However, due to its high viscosity, the hot melt adhesive begins to stretch into small filaments, sometimes continuously, without breaking for a long period of time. It is this extra volume from the module shut-off to the orifice exit in conjunction with the high viscosity of the hot melt adhesive that result in undesired angel hairs.

Accordingly, there is a need for improved hot melt adhesive dispensing systems including an improved adhesive cut-off module.

BRIEF SUMMARY

Hot melt dispensing systems are provided according to various embodiments. The hot melt dispensing systems include an adhesive cut-off module, which introduces a secondary liquid medium to break a hot melt adhesive stream without forming an angel hair.

In one aspect, a hot melt adhesive dispensing system is provided. The hot melt adhesive dispensing system includes a nozzle assembly, a hot melt adhesive delivery system configured to deliver a hot melt adhesive to the nozzle assembly, and a liquid delivery system configured to deliver the liquid to the nozzle assembly. The nozzle assembly includes an adhesive cut-off module, which is configured to cut-off a hot melt adhesive stream by dispensing a liquid.

In one embodiment, the adhesive cut-off module includes a spool valve assembly including an adhesive chamber and a liquid chamber. Further, the spool valve assembly has an adhesive dispensing position and a liquid dispensing position. The nozzle assembly dispenses the hot melt adhesive stream from the adhesive chamber in the adhesive dispensing position, and dispenses the liquid from the liquid chamber in the liquid dispensing position. The hot melt adhesive stream is cut-off when the position of the spool valve assembly is changed from the adhesive dispensing position to the liquid dispensing position. The liquid chamber can be configured to contain at least 50% less volume than the adhesive chamber.

Preferably, the liquid is water. The water in the adhesive cut-off module is heated and pressurized, and vaporizes into steam as it is dispensed from the adhesive cut-off module to cut-off the hot melt adhesive stream. The liquid chamber is configured to hold and release an amount of the heated and pressurized water, such that the water vaporizes into steam as it is release from the liquid chamber without forming a violent spray of the heated and pressurized water.

In another aspect, a hot melt adhesive dispensing system including a hot melt adhesive delivery system, a liquid delivery system, a nozzle assembly, an adhesive feed tube and a liquid feed tube is provided. The adhesive feed tube is arranged between the hot melt adhesive delivery system and the nozzle assembly for transporting a hot melt adhesive from the hot melt adhesive delivery system to the nozzle assembly, and the liquid feed tube is arranged between the liquid delivery system and the nozzle assembly for transporting the liquid from the liquid delivery system to the nozzle assembly. The nozzle assembly includes a spool valve assembly arranged in a spool valve housing, and an orifice output port. The spool valve assembly includes a spool valve, an adhesive chamber defined between the spool valve and the spool valve housing, a liquid chamber defined between the spool valve and the spool valve housing. The nozzle assembly dispenses a hot melt adhesive stream from the adhesive chamber in an adhesive dispensing position, and dispenses a liquid from the liquid chamber in a liquid dispensing position. The hot melt adhesive stream is cut-off when the nozzle assembly dispenses the liquid.

The spool valve is configured to move in the spool valve housing to change the position of the spool valve assembly from the adhesive dispensing position to the liquid dispensing position, or vice versa. Further, the orifice output port is in fluid communication with the adhesive chamber in the adhesive dispensing position, and in fluid communication with the liquid chamber in the liquid dispensing position.

In an embodiment, the spool valve housing has a first end and a second end, and is provided with a first air tube arranged proximate the first end and a second air tube arranged proximate the second end. In this embodiment, air pressure is supplied via the first air tube to move the spool valve from the adhesive dispensing position to the liquid dispensing position. Similarly, air pressure is supplied via the second air tube to move the spool valve from the liquid dispensing position to the adhesive dispensing position.

Preferably, the liquid is water, and the liquid delivery system delivers heated and pressurized water to the liquid chamber. The liquid chamber is configured to hold an amount of heated and pressurized water, such that the heated and pressurized water is vaporized into steam when released via the orifice output port to cut-off the hot melt adhesive stream. The liquid delivery system includes a water supply tank, a pressure regulator, a piston pump and a water pressure gauge, which are configured to control a temperature and pressure of the water.

Preferably, the liquid chamber is configured to contain at least 50% less volume than the adhesive chamber.

In yet another aspect, a method of cutting off a hot melt adhesive stream without forming an angel hair is provided. The method includes the steps of providing a hot melt adhesive dispensing system, dispensing a stream of hot melt adhesive through an orifice output port, stopping the stream of hot melt adhesive, and dispensing a liquid through the orifice output port to cut-off the stream of hot melt adhesive free of an angel hair formation.

Further, the step of dispensing a stream of hot melt adhesive includes heating and pressurizing a hot melt adhesive. The step of dispensing a liquid includes heating and pressurizing water. Preferably, the water is pressurized to about the same pressure as the hot melt adhesive.

In one embodiment, the step of dispensing a liquid includes releasing an amount of a heated and pressurized water, such that the heated and pressurized water is vaporized into steam when released from the orifice output port, thereby cutting off the stream of the hot melt adhesive free of an angel hair formation.

In another embodiment, the hot melt adhesive system includes a spool valve assembly including a spool valve. In this embodiment, the step of stopping the stream of hot melt adhesive includes moving the spool valve from an adhesive dispensing position to a liquid dispensing position.

Further, the spool valve assembly includes an adhesive chamber and a liquid chamber. The step of dispensing a stream of hot melt adhesive includes positioning the spool valve such that the orifice output port is in fluid communication with the adhesive chamber, the step of stopping the stream of hot melt adhesive includes moving the spool valve such that the orifice output port is not in fluid communication with the adhesive chamber, and the step of dispensing a liquid includes positioning the spool valve such that the orifice output port is in fluid communication with the liquid chamber.

Other aspects, objectives and advantages will become more apparent from the following detailed description when taken in conjunction with the accompanying drawings.

BRIEF DESCRIPTION OF THE DRAWINGS

The benefits and advantages of the present embodiments will become more readily apparent to those of ordinary skill in the relevant art after reviewing the following detailed description and accompanying drawings, wherein.

DETAILED DESCRIPTION

While the present disclosure is susceptible of embodiment in various forms, there is shown in the drawings and will hereinafter be described presently preferred embodiments with the understanding that the present disclosure is to be considered an exemplification and is not intended to limit the disclosure to the specific embodiments illustrated. The words "a" or "an" are to be taken to include both the singular and the plural. Conversely, any reference to plural items shall, where appropriate, include the singular.

Figure 1:
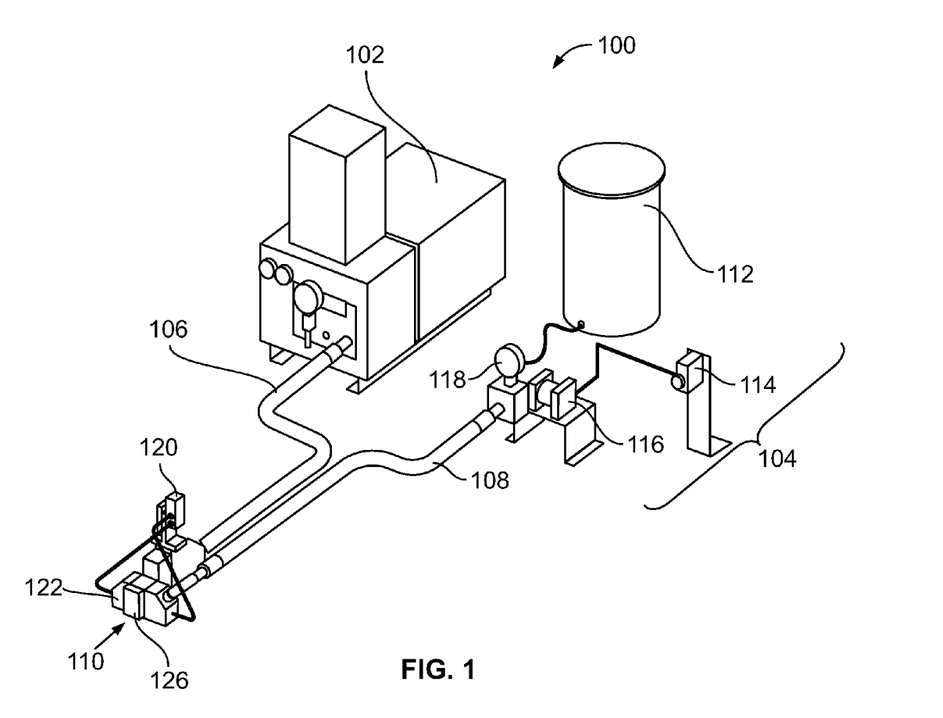
FIG. 1 is a perspective view illustrating a hot melt adhesive dispensing system according to an embodiment.

Referring now to the figures, FIG. 1 illustrates an embodiment of a hot melt adhesive dispensing system 100 including an adhesive cut-off module using water. The hot melt adhesive dispensing system 100 generally includes a hot melt adhesive delivery system 102, a water delivery system 104, an adhesive feed tube 106, a water feed tube 108, and a nozzle assembly 110. The water delivery system 104 includes a water supply tank 112, a pressure regulator 114, a piston pump 116, and a water pressure gauge 118.

Figure 2:
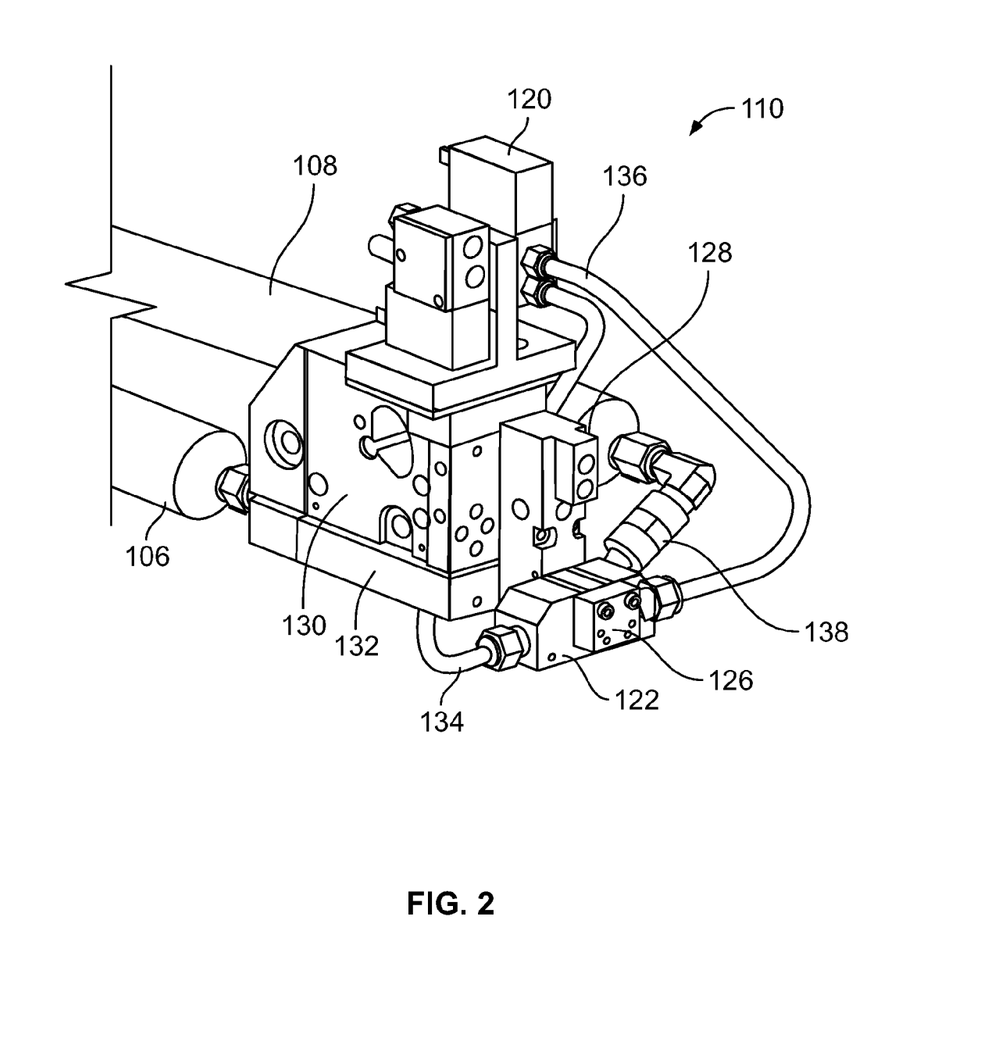
FIG. 2 is a perspective view of a nozzle assembly of the hot melt adhesive dispensing system of FIG. 1.

As shown in FIGS. 1-2, the nozzle assembly 110 includes a spool valve solenoid 120, a spool valve housing 122, which houses a spool valve assembly 124 (FIGS. 3-4), an orifice 126, a module valve 128, a service block 130, and an air heater block 132. Preferably, the spool valve assembly 124 is arranged proximate the module valve 128, such that the spool valve assembly 124 may be incorporated into the module valve 128. The nozzle assembly 110 further includes a first spool valve air line 134 and a second spool valve air line 136 providing air pressure for moving the spool valve 124 from one position to another, and a water inlet fitting 138 for supplying water to cut-off the adhesive.

Figure 3:
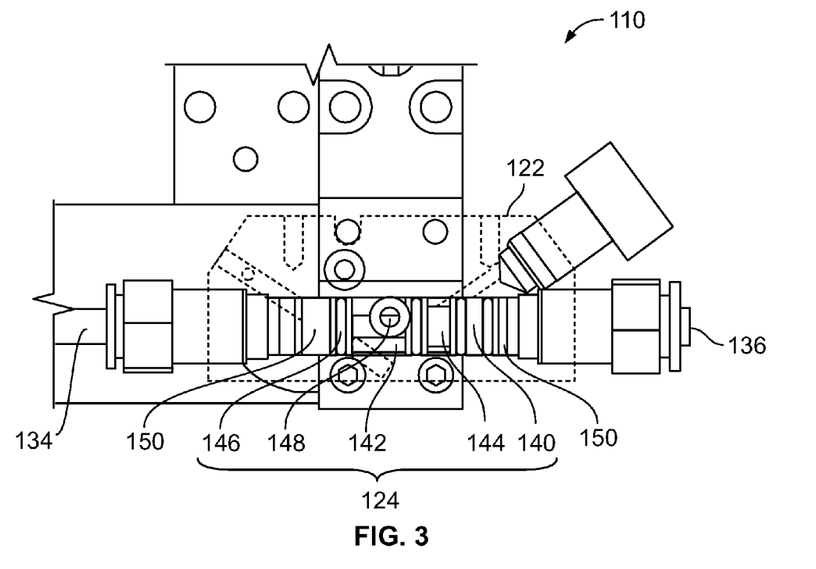
FIG. 3 is a perspective view of a spool valve assembly of the nozzle assembly of FIG. 2 in an adhesive dispensing position, in which a spool valve housing is illustrated as transparent to show components of the spool valve assembly.
Figure 4:
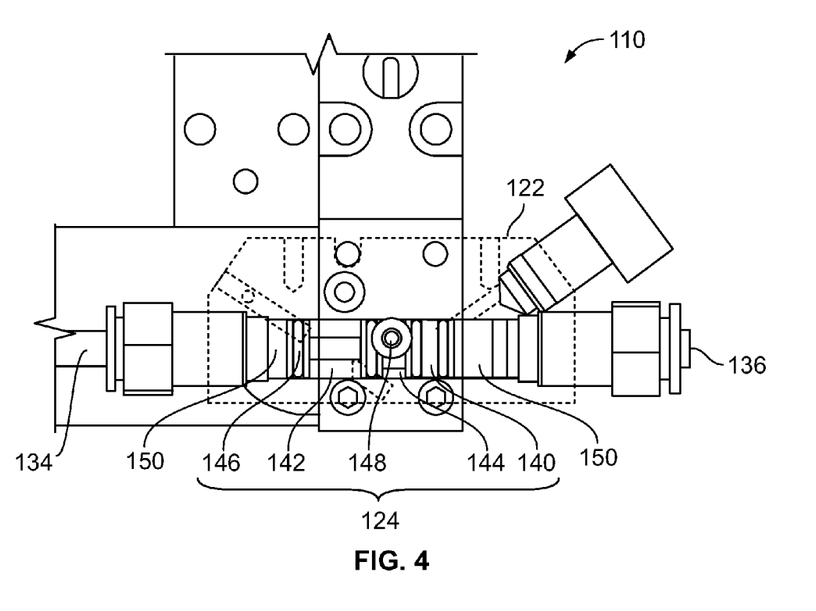
FIG. 4 is a perspective view of the spool valve assembly FIG. 3 in a water dispensing position.

FIGS. 3-4 illustrate the spool valve assembly 124, which provides an adhesive cut-off mechanism using water. In these figures, the spool valve housing 122 is depicted as transparent to show components of the spool valve assembly 124. The spool valve assembly 124 generally includes a spool valve 140, an adhesive chamber 142, a water chamber 144, a spool valve o-ring 146, spool valve stops 150, and an output port 148 to the orifice 126. In some embodiments, the spool valve 124 and the spool valve housing 122 are formed from lapped steel. In such embodiments, the spool valve o-ring 146 may be eliminated from the spool valve assembly 124.

In FIG. 3, the spool valve assembly 124 is in an adhesive dispensing position. In this position, the output port 148 is in fluid communication with the adhesive chamber 142 to dispense an adhesive stream. To cut-off the adhesive stream, air pressure is applied through the second spool valve air line 136 to move the spool valve 140 to left to a water dispensing position. The spool valve assembly 124 in the water dispensing position is shown in FIG. 4. In this position, the output port 148 is in fluid communication with the water chamber 144 to dispense water. When the spool valve 140 is moved and water is dispensed, it breaks the adhesive stream cleanly without forming a fine strand of adhesive. Although, water is used as a liquid medium to cut-off an adhesive stream in this embodiment, other non-adhesive liquid media, such as lotion, can be used.

In one embodiment, an adhesive in the hot melt adhesive dispensing system 100 is heated to about 290° F. to 330° F., and pressurized to about 100 psi to about 500 psi depending on the orifice size. At the end of a run, heated and pressurized water is introduced into the heated and pressurized adhesive stream to cut-off the adhesive stream. The water pressure in the water feed tube 108 is raised to approximately the same pressure as the adhesive stream to balance the cycling forces in the spool valve 140. The elevated water pressure also prevents the water from boiling at the elevated temperature in the spool valve housing.

Figure 5:
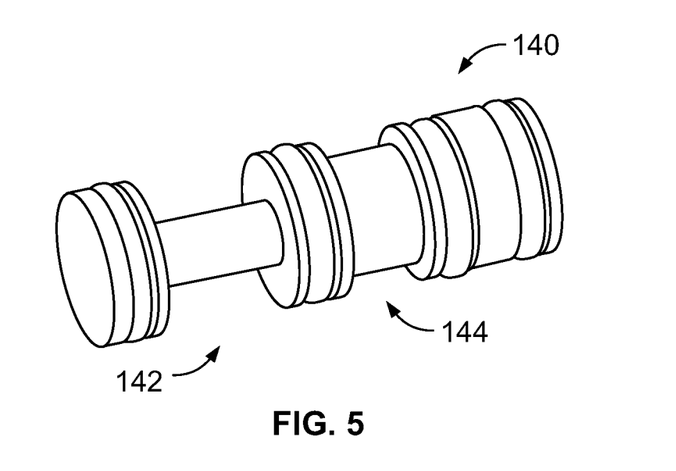
FIG. 5 is an illustration of a spool valve in the spool valve assembly of FIGS. 3-4.
Figure 6A:
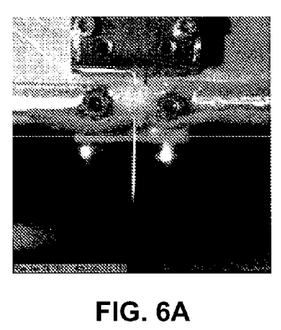
FIGS. 6A-6H are photographs of the spool valve assembly of FIG. 4 showing an adhesive stream being cut-off by a burst of steam created when water is released.
Figure 6B:
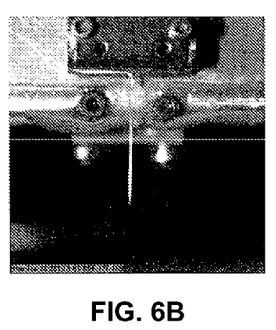
Figure 6C:
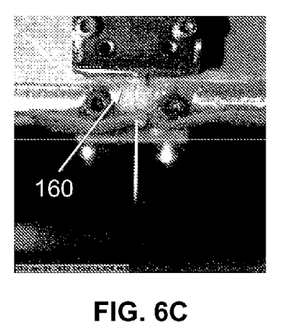
Figure 6D:
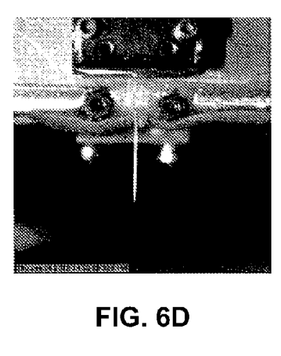
Figure 6E:
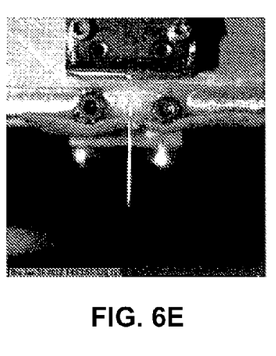
Figure 6F:
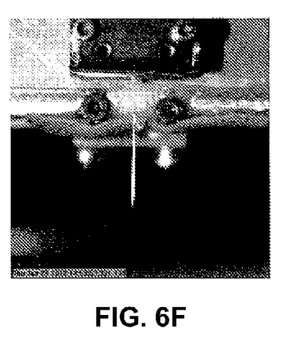
Figure 6G:
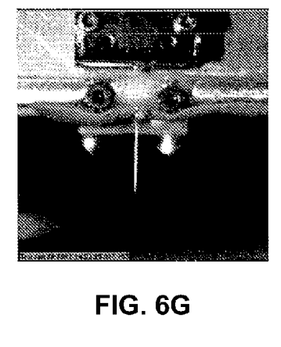
Figure 6H:
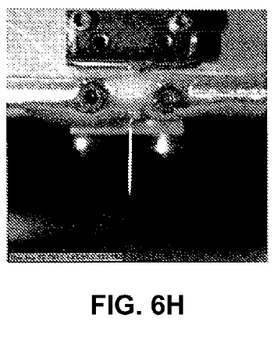

The size of the water chamber 144 is configured to capture a relatively small amount of water, which when released, "pops" as it vaporizes into steam to break the adhesive stream without interrupting the omega spray pattern. FIG. 5 is an illustration of the spool valve 140 according to a preferred embodiment. As shown, the water chamber 144 is configured to capture a smaller volume of liquid than the adhesive chamber 142, preferably at least 50% less volume. The spool valve timing can also be adjusted to provide a clean adhesive cut-off mechanism. FIGS. 6A-6H show photographs of an adhesive stream being cut-off by introduction of water. As shown in FIG. 6C, the adhesive stream is broken by a slight burst of steam (see the area indicated by the arrow 160.)

Figure 7:
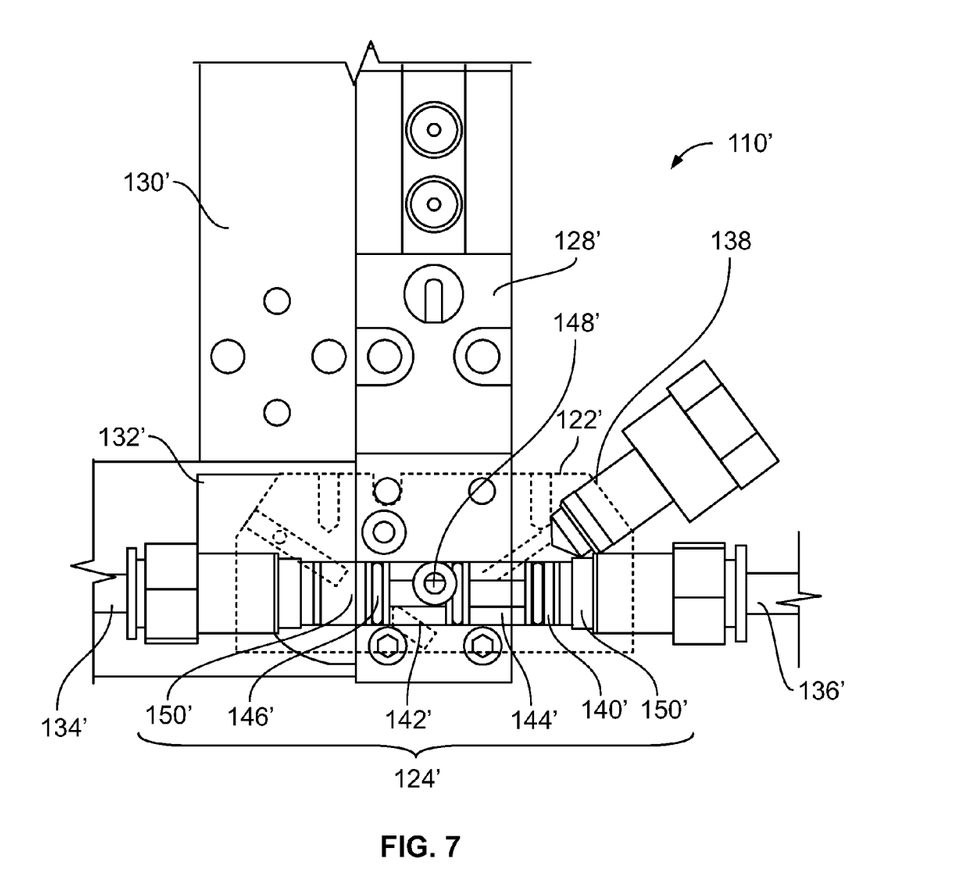
FIG. 7 is a perspective view a spool valve assembly according to another embodiment, in which a spool valve assembly is illustrated as transparent to show components of the spool valve assembly.

FIG. 7 shows a nozzle assembly 110' according to another embodiment. The nozzle assembly 110' is configured similarly to the nozzle assembly 110 and generally includes a spool valve housing 122', a module valve 128', a service block 130', an air heater block 132', a first spool valve air line 134', a second spool valve air line 136', and a water inlet fitting 138. The spool valve housing 122' is illustrated as transparent to show components of a spool valve assembly 124'. The spool valve assembly 124' is also similarly configured as the spool valve assembly 124, and generally includes a spool valve 140', an adhesive chamber 142', a water chamber 144', a spool valve o-ring 146', spool valve stops 150', and an output port 148' to an orifice. However, the water chamber 144' of this embodiment is configured to capture a larger volume of water than the water chamber 144 of the previous embodiment.

Figure 8:
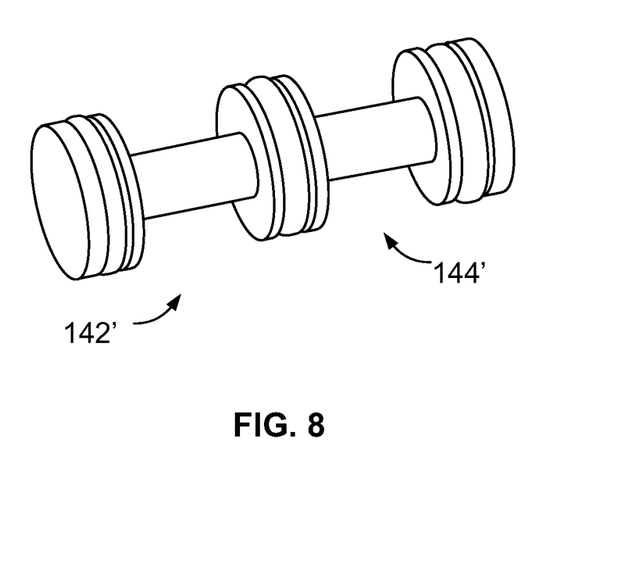
FIG. 8 is an illustration of a spool valve of the spool valve assembly of FIG. 7

FIG. 8 is an illustration of the spool valve 140'. As shown, the spool valve 140' is configured such that the adhesive chamber 142' and the water chamber 144' capture approximately the same volume of liquid. However, a larger amount of water captured by the water chamber 144' can create a violent spray when released, which can detrimentally affect the omega spray pattern.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover by the appended claims all such modifications as fall within the scope of the claims.

What is claimed is:

1. A hot melt adhesive dispensing system, comprising:
a nozzle assembly including an adhesive cut-off module, wherein the adhesive cut-off module is configured to cut-off a hot melt adhesive stream free of an angel hair formation by dispensing a non-adhesive liquid;
a hot melt adhesive delivery system configured to deliver a hot melt adhesive to the nozzle assembly; and
a liquid delivery system configured to deliver the non-adhesive liquid to the nozzle assembly;
wherein the adhesive cut-off module includes a spool valve assembly including an adhesive chamber and a liquid chamber, wherein the adhesive chamber and the liquid chamber are two separate chambers divided by a wall therebetween, the spool valve assembly having an adhesive dispensing position and a liquid dispensing position, wherein the nozzle assembly dispenses the hot melt adhesive stream from the adhesive chamber in the adhesive dispensing position, and dispenses the non-adhesive liquid from the liquid chamber in the liquid dispensing position, wherein the hot melt adhesive stream is cut-off when the position of the spool valve assembly is changed from the adhesive dispensing position to the liquid dispensing position.

2. The hot melt adhesive dispensing system of claim 1, wherein the liquid chamber is configured to contain at least 50% less volume than the adhesive chamber.

3. The hot melt adhesive dispensing system of claim 1, wherein the non-adhesive liquid is water, and the water in the adhesive cut-off module is heated and pressurized, wherein the water vaporizes into a steam as the water is dispensed from the adhesive cut-off module to cut-off the hot melt adhesive stream.

4. The hot-melt adhesive dispensing system of claim 1, wherein the non-adhesive liquid is water, and the water in the liquid chamber is heated and pressurized, wherein the liquid chamber is configured to hold and release an amount of the heated and pressurized water such that the water is vaporized into a steam as it is release from the liquid chamber and free of a violent spray of the heated and pressurized water.

5. A hot melt adhesive dispensing system, comprising:
a hot melt adhesive delivery system;
a non-adhesive liquid delivery system;
a nozzle assembly including an adhesive cut-off module configured to cut-off a hot melt adhesive stream free of an angel hair formation, wherein the adhesive cut-off module includes a spool valve assembly arranged in a spool valve housing and an orifice output port, the spool valve assembly comprising:
a spool valve;
an adhesive chamber defined between the spool valve and the spool valve housing;
a liquid chamber defined between the spool valve and the spool valve housing, wherein the adhesive chamber and the liquid chamber are two separate chambers divided by a wall therebetween;
wherein the nozzle assembly dispenses a hot melt adhesive stream from the adhesive chamber in an adhesive dispensing position, and dispenses a non-adhesive liquid from the liquid chamber in a liquid dispensing position, wherein the hot melt adhesive stream is cut-off when the nozzle assembly dispenses the non-adhesive liquid;
an adhesive feed tube arranged between the hot melt adhesive delivery system and the nozzle assembly for transporting a hot melt adhesive from the hot melt adhesive delivery system to the nozzle assembly; and
a liquid feed tube arranged between the liquid delivery system and the nozzle assembly for transporting the non-adhesive liquid from the liquid delivery system to the nozzle assembly.

6. The hot melt adhesive dispensing system of claim 5, wherein the spool valve is configured to move in the spool valve housing to change the position of the spool valve assembly from the adhesive dispensing position to the liquid dispensing position, or vice versa.

7. The hot melt adhesive dispensing system of claim 6, wherein the orifice output port is in fluid communication with the adhesive chamber in the adhesive dispensing position, and in fluid communication with the liquid chamber in the liquid dispensing position.

8. The hot melt adhesive dispensing system of claim 5, wherein the spool valve housing has a first end and a second end, and further including a first air tube arranged proximate the first end and a second air tube arranged proximate the second end, wherein air pressure is supplied via the first air tube to move the spool valve from the adhesive dispensing position to the liquid dispensing position, and air pressure is supplied via the second air tube to move the spool valve from the liquid dispensing position to the adhesive dispensing position.

9. The hot melt adhesive dispensing system of claim 5, wherein the non-adhesive liquid is water, and wherein the liquid delivery system delivers heated and pressurized water to the liquid chamber.

10. The hot melt adhesive dispensing system of claim 9, wherein the liquid chamber is configured to hold an amount of heated and pressurized water, such that the heated and pressurized water is vaporized into a steam when released via the orifice output port to cut-off the hot melt adhesive stream.

11. The hot melt adhesive dispensing system of claim 9, wherein the liquid delivery system includes a water supply tank, a pressure regulator, a piston pump and a water pressure gauge, which are configured to control a temperature and a pressure of the water.

12. The hot melt adhesive dispensing system of claim 5, wherein the liquid chamber is configured to contain at least 50% less volume than the adhesive chamber.

13. A method of cutting off a hot melt adhesive stream free of an angel hair formation, comprising the steps of:
   providing a hot melt adhesive dispensing system;
   dispensing a stream of hot melt adhesive through an orifice output port;
   stopping the stream of hot melt adhesive; and
   dispensing a non-adhesive liquid through the orifice output port to cut-off the stream of hot melt adhesive free of an angel hair formation.

14. The method of claim 13, wherein dispensing a stream of hot melt adhesive includes heating and pressurizing a hot melt adhesive.

15. The method of claim 14, wherein dispensing a non-adhesive liquid includes heating and pressurizing water, wherein the water is pressurized to about the same pressure as the hot melt adhesive.

16. The method of claim 14, wherein dispensing a non-adhesive liquid includes releasing an amount of a heated and pressurized water, such that the heated and pressurized water is vaporized into a steam when released from the orifice output port, thereby cutting off the stream of the hot melt adhesive free of an angel hair.

17. The method of claim 13, wherein the hot melt adhesive system includes a spool valve assembly including a spool valve, wherein stopping the stream of hot melt adhesive includes moving the spool valve from an adhesive dispensing position to a liquid dispensing position.

18. The method of claim 17, wherein the spool valve assembly includes an adhesive chamber and a liquid chamber, wherein dispensing a stream of hot melt adhesive includes positioning the spool valve such that the orifice output port is in fluid communication with the adhesive chamber, stopping the stream of hot melt adhesive includes moving the spool valve such that the orifice output port is not in fluid communication with the adhesive chamber, and dispensing a non-adhesive liquid includes positioning the spool valve such that the orifice output port is in fluid communication with the liquid chamber.

* * * * *